(12) United States Patent
Powell et al.

(10) Patent No.: US 7,357,424 B2
(45) Date of Patent: Apr. 15, 2008

(54) PLASTIC GUARD FOR AIRBRAKE TUBING AND COILS

(75) Inventors: Steven M. Powell, Chardon, OH (US); James L. Johnston, N. Canton, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 11/140,212

(22) Filed: May 27, 2005

(65) Prior Publication Data

US 2006/0108790 A1 May 25, 2006

Related U.S. Application Data

(60) Provisional application No. 60/624,791, filed on Nov. 3, 2004.

(51) Int. Cl.
*F16L 13/04* (2006.01)

(52) U.S. Cl. .................. 285/115; 285/116; 285/45

(58) Field of Classification Search .............. 285/114, 285/115, 116, 45
See application file for complete search history.

(56) References Cited

U.S. PATENT DOCUMENTS

| | | | |
|---|---|---|---|
| 3,784,236 A * | 1/1974 | Slocum ................... | 285/45 |
| 3,830,531 A | 8/1974 | Burge | |
| 3,907,335 A | 9/1975 | Burge et al. | |
| 4,136,897 A | 1/1979 | Haluch | |
| 4,188,051 A | 2/1980 | Burge | |
| 4,288,113 A | 9/1981 | Saulnier | |
| 4,302,036 A | 11/1981 | Burge | |
| 4,335,908 A | 6/1982 | Burge | |
| 4,602,808 A | 7/1986 | Herron et al. | |
| 5,024,468 A | 6/1991 | Burge | |
| 5,181,750 A * | 1/1993 | Reum ..................... | 285/38 |
| 5,246,254 A * | 9/1993 | LoJacono et al. ........ | 285/16 |
| 5,316,348 A * | 5/1994 | Franklin ................. | 285/39 |
| 5,346,290 A | 9/1994 | Orcutt | |
| 5,816,622 A | 10/1998 | Carter | |
| 5,857,711 A | 1/1999 | Comin-DuMong et al. | |
| 6,098,666 A | 8/2000 | Wells et al. | |
| 6,494,496 B1 | 12/2002 | Sweeney | |
| 6,604,758 B1 | 8/2003 | Assenheimer | |
| 7,011,342 B2 * | 3/2006 | Guivarc'h et al. ........ | 285/116 |
| 2003/0062722 A1 | 4/2003 | Linhart | |
| 2004/0103949 A1 | 6/2004 | Rickards | |

FOREIGN PATENT DOCUMENTS

EP 1 089 029 4/2001

OTHER PUBLICATIONS

Parflex® Thermoplastic Hose, Tubing, Fittings and Accessories, Catalog 4660, dated Feb. 1, 2003.
Parker Brass Fittings and Valves, Catalog 3501E, dated Jan. 2004.

* cited by examiner

*Primary Examiner*—David Bochna
(74) *Attorney, Agent, or Firm*—John A. Molnar, Jr.

(57) ABSTRACT

A moldable plastic guard for use in a protective guard for a conduit such as a hoses, tubing, wire, cable, and fiber optics. The guard is receivable over the surface of the conduit and is attached to a nut. The nut may be used to join the end of the conduit to a fitting or other connection.

7 Claims, 3 Drawing Sheets

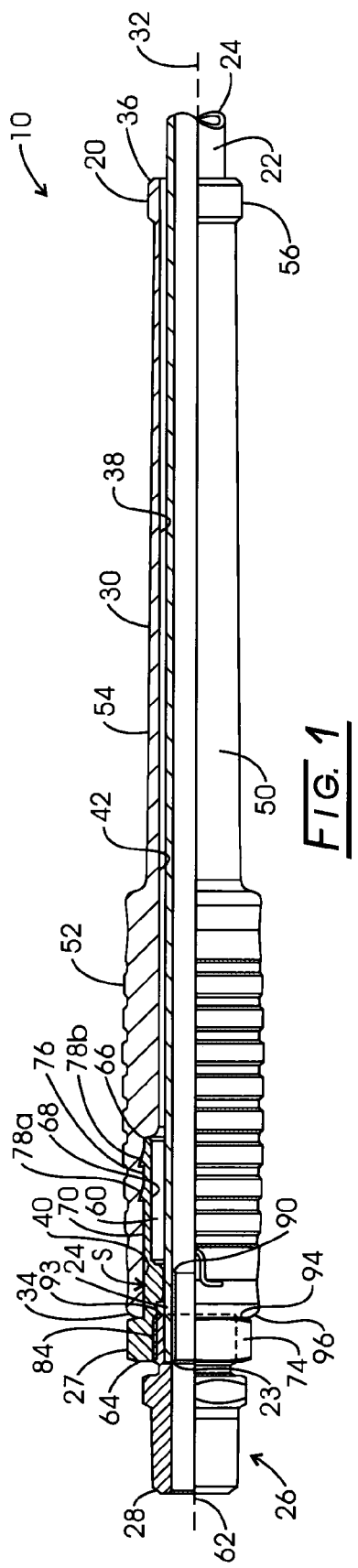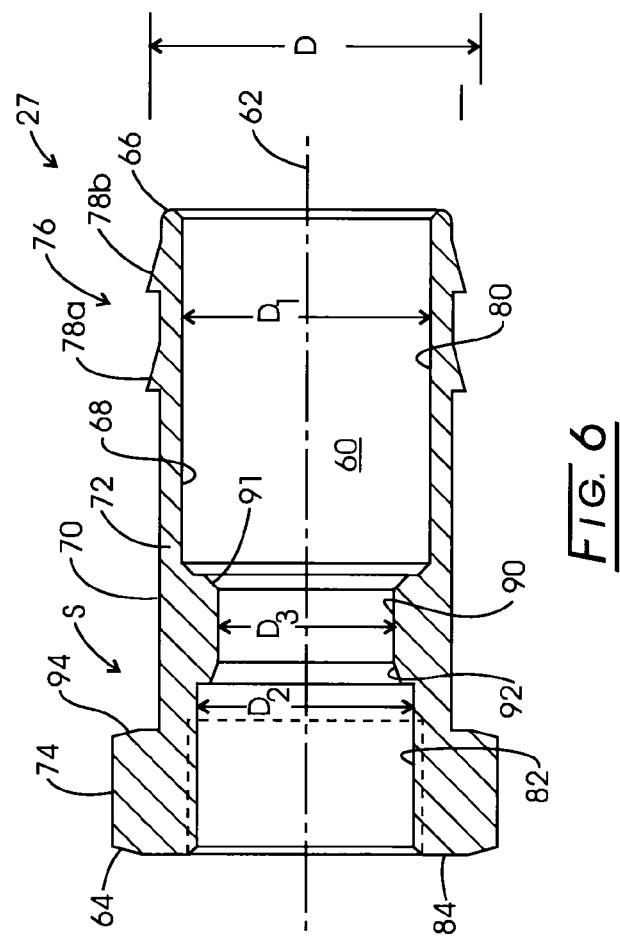

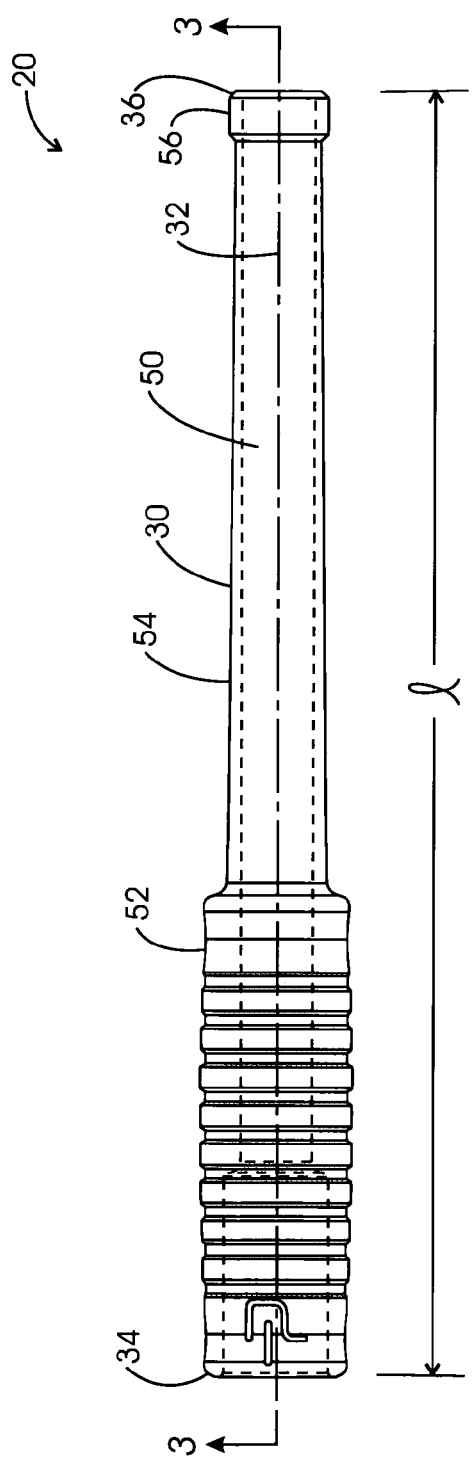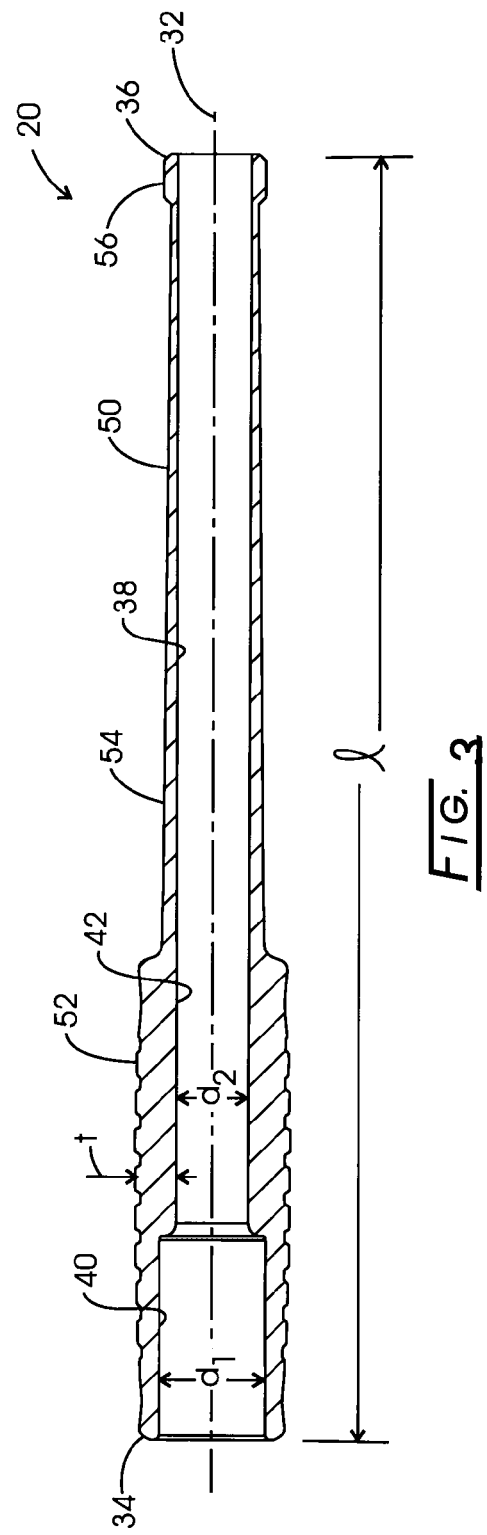

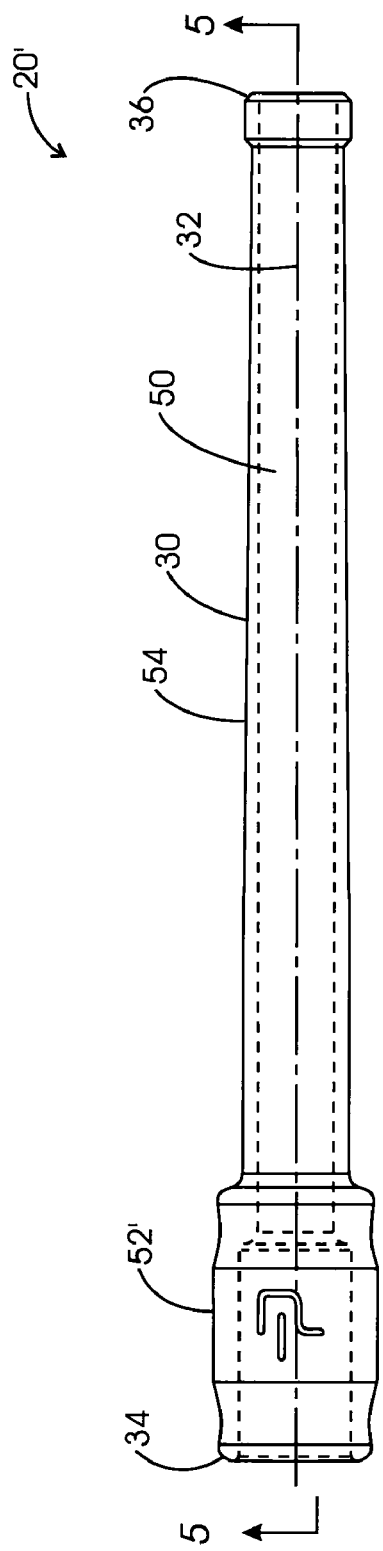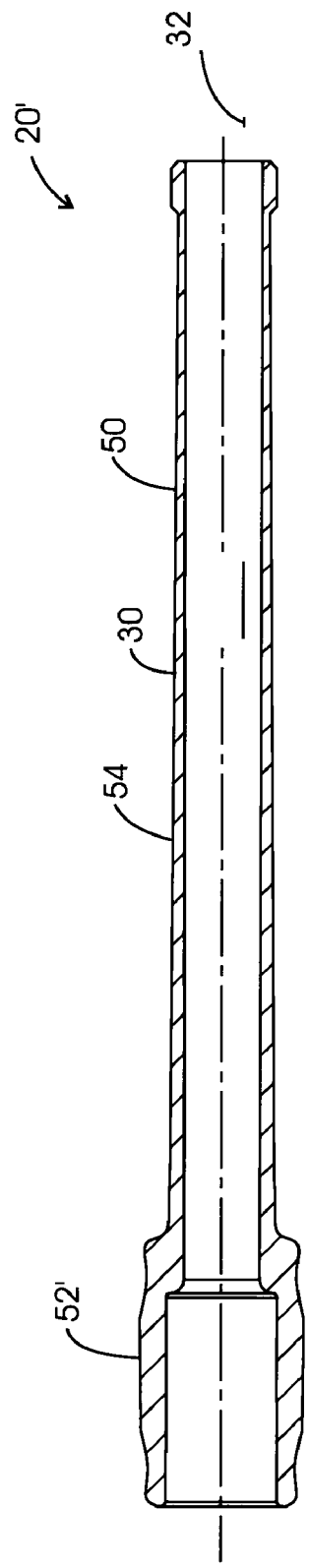

is considered to be either too flexible to prevent kinking, or too rigid to prevent flexing of the hose without breaking or kinking the guard absent the addition of strain relief slots. Spiral guards, typically provided as strips of plastic thermoformed about a mandrel into a helical shape, also offer long, variable lengths, but generally do not afford appreciable kink resistance. Molded guards, however, can be formed with the rigidity necessary to prevent kinking.

PLASTIC GUARD FOR AIRBRAKE TUBING AND COILS

CROSS-REFERENCE TO RELATED CASES

The present application claims the benefit of the filing date of U.S. Provisional Application Ser. No. 60/624,791; filed Nov. 3, 2004, the disclosure of which is expressly incorporated herein by reference.

BACKGROUND OF THE INVENTION

The present invention relates broadly to protective guards for conduit such as hose, tubing, wire, cable, and fiber optics, and more particularly to a moldable, plastic guard for use as a corrosion-resistant, weight saving replacement for the wire spring guards conventionally used in airbrake tubing coil applications.

When conduit such as hose, tubing, wire, cable, or fiber optics is exposed to certain environmental conditions, physical obstacles, or human abuse, the portion of the conduit so exposed may be protected with an external guard or armor. Such guards typically are formed as a coiled steel wire spring or, alternatively, as an elongate plastic or rubber sleeve or spiral. The coil, sleeve, or spiral is configured as having an inner diameter which is sized to be marginally larger than the outer diameter of the wire or conduit to allow the guard to be installed coaxially over the hose or wire. Guards or armor of such type are shown in commonly-assigned U.S. Pat. No. 6,494,496; and in U.S. Pat. Nos. 6,604,758; 5,857,711; 5,816,622; 5,608,963; 5,346,290; 5,277,227; 4,967,799; 4,876,810; 4,805,933; 4,602,808; 4,446,607; 4,406,852; and 3,926,141; Des. 356,858; and European Pat. Appln. Nos. 824,205; and 655,377. A plastic guard is manufactured by WABCO (Westinghouse Air Brake Co.) GmbH of Hannover, Germany.

Typical applications of guards and coils of such type include the protection of hydraulic hose in construction machinery or plant equipment, and of airbrake tubing coils in tractor trailers rigs and other vehicles. Hoses, tubing, fittings, and other components for these applications are described further in commonly-assigned U.S. Pat. Nos. 6,098,666; 5,024,468; 4,335,908; 4,302,036; 4,288,113; 4,188,051; 4,136,897; 3,907,335; 3,830,531; and in U.S. Pat. Nos. 5,918,640; 5,232,645; 4,009,734; and 3,977,440; and U.K. Pat. Appln. GB 2,239,503. Certain of such components are manufactured commercially by Parker-Hannifin Corporation of Cleveland, Ohio, through its Parflex Division of Ravenna, Ohio, and its Brass Products Division of Otsego, Mich., and by Tectran, Inc., of Mississauga, Ontario, Canada.

Each of the guard types heretofore known in the art offer varying degrees of strain relief and/or cut, crush, abrasion, or kink resistance. In general, steel wire springs offer good kink and abrasion resistance. However, as being formed of a metal, springs are subject to corrosion, have a tendency to scratch paint and other finishes, and are relatively heavy which may impact their use in certain mobile applications. When employed at the connected end of a hose or tubing assembly, the spring conventionally is locked to the end fitting which usually is provided as a multi-component including a body, nut, ferrule, and insert.

Plastic or rubber sleeves or spirals conventionally are manufactured by either extrusion, molding, or spiraling, and are known to be generally lightweight and corrosion resistant. In particular, extruded guards offer long, continuous lengths, but the raw materials suited for extrusion generally In view of the foregoing, it is believed that continued improvements in guard constructions, and particularly in molded constructions, for wire and conduit tubing coil assemblies would be well-received by the transportation, construction, and other industries involved.

BROAD STATEMENT OF THE INVENTION

The present invention is directed to a protective guard for conduit such as hose, tubing, wire, cable, and fiber optics, and more particularly to a guard and an assembly therefor for use as a replacement for the wire spring guards conventionally used in airbrake tubing coil applications.

Such guard may be molded or otherwise formed of plastic material which may be both corrosion-resistant and lightweight, and further which may be selected to provide sufficient rigidity to prevent kinking and to offer good abrasion resistance. Advantageously, the guard may be adapted for a push-on, threaded, or other connection to the nut which is used for the connection of the end of the coil or other tubing within the given application. Such nut, in turn, may be configured to accommodate such connection.

These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 1 is a partial cross-sectional view of a representative airbrake coil or other tubing assembly including a guard and fitting having a nut in accordance with the present invention;

FIG. 2 is a side view of the guard of FIG. 1;

FIG. 3 is a longitudinal cross-sectional view of the guard of FIG. 2 taken through line 3-3 of FIG. 2;

FIG. 4 is a side view of an alternative embodiment of the guard of FIG. 1;

FIG. 5 is a longitudinal cross-sectional view of the guard of FIG. 4 taken through line 5-5 of FIG. 4; and FIG. 6 is a radial cross-sectional view of the nut of the fitting of FIG. 1.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," "inside," or "inboard" and "outward," "outer," "exterior," "outside," or "outboard" referring, respectively, to directions toward and away from the center of the referenced element, the terms "radial" or "vertical" and "axial" or "horizontal" referring, respectively, to directions, axes, or planes perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows or underscores.

For the illustrative purposes of the discourse to follow, the precepts of the guard of the present invention are described in conjunction with its adaptation for an airbrake coil or other tubing used within tractor/trailer rigs or other vehicles for supplying air pressure from a source to the airbrake system of the vehicle. In view of the discourse to follow, however, it will be appreciated that aspects of the present invention may find utility for protecting other fluid conduits used in variety of hydraulic, pneumatic, or other applications involving coiled or straight runs of tubing, hose, wire, cable, fiber optics, or the like. Use with those other such conduits and applications therefore should be considered to be expressly within the scope of the invention herein involved.

Referring then to the figures wherein corresponding reference characters are used to designate corresponding elements throughout the several views with equivalent elements being referenced with prime or sequential alphanumeric designations, shown generally at 10 in FIG. 1 is a representative embodiment of a guard assembly according to the present invention. Such assembly 10 includes a protective guard, 20, which is sheathed coaxially over the exterior surface, 22, of one end, 23, of an airbrake coil or other length of tubing, 24. The end 23 of the coil or other tubing length 24 may be coupled to an associated fitting or other connection, referenced generally at 26, via a nut, 27, which may be formed of a metal, plastic, or other material of construction, and to which the guard 20 may be interference fit or otherwise connected. Such fitting 26 may have an associated fitting body, 28, and a sleeve or ferrule, 29.

In basic construction, guard 20 includes a generally flexible, elongate, tubular body, 30. Although a single body or segment 30 is shown, it should be appreciated that two or more bodies 30 may be joined together, such as in the manner described in commonly assigned U.S. Pat. No. 6,494,496.

As may be seen best with additional reference to the views of FIGS. 2 and 3, body 30 extends longitudinally along a central axis, 32, intermediate a first end, 34, and a second end, 36, which define a length, referenced at "λ" in the cross-sectional view of FIG. 3, of the guard 20 therebetween. With reference particularly to the cross-sectional view of FIG. 3, the body 30 has an radial inner surface, referenced generally at 38, including an end portion, 40, at the body first end 34 having a first inner diametric extent, referenced at "$d_1$," with the remainder, 42, of the surface 38 having a second inner diametric extent, referenced at "$d_2$." For the connection of the guard 20 to the nut 27 of the fitting 26, the dimension $d_1$ may be sized so as to accommodate the receiving of the body first end 34 over a complementary end portion of the nut 27, with the dimension $d_2$ being sized to be marginally larger than the outer diameter of the tubing 24 or otherwise to fit more closely over the exterior surface 22 thereof.

The body 30 of guard 20 may be molded of a synthetic rubber material such as Buna N, neoprene, or a thermoplastic blend. However, for increased rigidity and correspondingly improved kink resistance, body 30 may be molded of a resilient plastic material, which may be filled, i.e., reinforced, or unfilled, such as a poly(ether ether ketone), polyimide, polyamide, polyolefin, polyetherimide, polybutylene terephthalate, fluoropolymer, polyvinyl chloride, polysulfone, polyester, acetal homo or copolymer, a TPEs such as a thermoplastic polyurethane (TPU), thermoplastic olefin (TPO), thermoplastic vulcanizate (TPV), or copolyester thermoplastic elastomer (COPE) or polyamide TPE, or a copolymer, blend, mixture, laminate, composite, or other combination of one or more of the foregoing materials. Typically, the plastic or other material of construction for the molding or other forming of the guard 20 may have a hardness of between about 85 Shore A and about 65 Shore D.

With continuing reference to FIGS. 1-3, it may be seen in the illustrated airbrake coil or other tubing application that the outer surface, 50, of body 30 may be configured at a first segment, 52, adjacent the first end 34 thereof as having an increased wall thickness, referenced generally at "t" (FIG. 3) relative to the remaining second segment, 54, thereof, so as to be relatively rigid or otherwise less flexible as compared to the segment 54. In this regard, the segment 52, which also may be rounded as shown or otherwise contoured, thereby may function as an integral, hand-graspable lever or handle. Such handle advantageously may be used in place of the more complicated and expensive handle arrangements heretofore used in the "gladhand" connection of airbrake coils to the vehicle air supply. "Gladhand" connections and conventional handles of the type herein involved are further described in U.S. Pat. Nos. 5,918,640; 4,634,151; 4,366,965; and 4,226,103. The segment 52 may terminate as shown at the body first end 34, with the body second end 36 terminating, as shown, at a boss, 56, surrounding the body second end 36.

The remaining second segment 54 of the body 30 may be formed, for example, as having strain relief slots or a stepped wall thickness, or as shown, as otherwise having a decreasing, i.e., tapered, wall thickness so as to exhibit a minimum bend radius or other degree of flexibility. In this way, the segment 54 may be made to resiliently conform to the bending of the tubing while delimiting such bending beyond the minimum bend radius of the tubing to prevent kinking.

Looking now momentarily to the several views of FIGS. 4 and 5, an alternative embodiment of guard 20 of FIGS. 2 and 3 is referenced generally at 20'. In the embodiment 20', it may be seen that the segment 52, now reference at 52', is shortened such as if a glandhand end should not be required.

Returning to FIG. 1, as mentioned, for the connection of the guard 20 to the nut 27 of the fitting 26, the dimension $d_1$ of the body inner radial surface 38 is sized at 40 so as to accommodate the receiving of the body first end 34 over a complementary end portion of the nut 27. In this regard, and with reference now to the cross-sectional view of the nut 27 shown in FIG. 6, nut 27, which may be of a generally annular configuration as having a bore, 60, extends along a central longitudinal axis, 62, intermediate a forward end, 64, and a rearward end, 66. Nut 27 has an inner radial surface, 68, which defines the bore 60, and an outer radial surface, 70, which, with the inner radial surface 68, defines the wall, referenced at 72, of the nut therebetween. As may be seen with momentary reference to FIG. 1, in the assembly 10, the nut axis 62 is aligned coaxially with the axis 32.

Returning to FIG. 6, in the illustrated embodiment, the outer radial surface 70 of the nut 27 is configured at the forward end 64 having hexagonal or other flats portions, 74, for rotational engagement with a wrench or other tool for make-up or disassembly, and at the rearward end 66 as having an engaging portion, 76, for the engagement of the guard first end 34 therewith in the attachment of the guard 20 (FIG. 1) to the nut 27. In this regard, the engaging portion 76 may be configured as having one or more rearwardly-facing barbs or other projections, 78a-b. Such barbs 78a-b define the radial outermost diametric extent, referenced at D, of the nut engaging portion 76, and are sized relative to the first inner diametric extent $d_1$ of the guard body first end portion 40 (FIG. 2) so as to allow such portion to be pushed-on, such as by hand or otherwise, over the engaging portion 76, thereby attaching the guard 20 to the fitting nut 27.

In the case of the guard 20 being formed of a plastic or other resilient material, the extent D may be provided to be marginally larger than the first inner diametric extent $d_1$ of the guard body first end portion 40 (FIGS. 1 and 2) so as to allow for the incremental expansion of the body end portion 40 upon insertion, of the engaging portion 76 thereinto and the subsequent relaxation thereof compressively retaining the end 34 of the body 30 on the end 66 of the nut 27. In addition, the diametric extent of the remainder of the engaging portion 76 from which the barbs 78 extend may be sized relative to the diameter of the flats portion 74 so as to provide an annular space, referenced at "s" in FIGS. 1 and 6, which may approximate the wall thickness of the tubing 24. In this way, when the tubing end 23 is sheathed over the nut engaging portion 76, a generally continuous, smooth surface appearance may be achieved as between the tubing exterior surface 22 and the flats portion 74.

Advantageously, the inter-engagement of the barbs 78 and the body first end portion 40 (FIG. 1) may be used to prevent the guard 20 from being inadvertently pulled off of the nut 27 by hand. Alternatively, the engaging portion 76 may be externally-threaded, notched, or otherwise configured relative to the complementary configuration of the body first end portion so as to allow for the attachment of the guard 20 to the nut 27.

The inner radial surface 68 of the nut 27, in turn, is configured at the rearward end 66 as having a rearward portion, 80, which may having a first inner diameter, $D_1$, sized such that the outer diameter of the tubing 24 (FIG. 1) therethrough is able to be received therethrough. At the forward end 64, the nut inner radial surface 68 is configured as having a forward portion, 82, having a second inner diametric extent, $D_2$, which may be the same as or different from $D_1$, and which otherwise is sized to internally receive the fitting ferrule 29 (FIG. 1).

The nut 27 may be threaded so as to be couplable to an end of an associated externally-threaded connection (not shown) for the tubing 24. For example, in a "female" style embodiment, and is referenced at 84, the forward portion 82 of the inner radial surface 68 may be internally threaded at the forward terminus thereof. Alternatively, in a "male" style embodiment, the hexagonal flats portion 74 on the nut outer radial surface 70 may be shortened or otherwise moved rearwardly such that the surface may be configured at the forward end 64 as having external threads.

In whatever style the nut 27 is provided, the nut inner radial surface 68 further may be configured as having an internal, shoulder, 90, extending radially inwardly relative to the forward portion 82 as disposed intermediate the forward portion and the rearward portion 80. Such shoulder 90, which may include a rearwardly-facing chamfer, 91, to assist in the insertion of the tubing end 23 (FIG. 1) therethrough, defines a third inner diametric extent, $D_3$, of the nut inner radial surface 68. Such extent $D_3$ may, as shown, be smaller than extents $D_1$ and $D_2$, or, alternatively, may be same or substantially the same as the extent $D_1$ provided that such extents are smaller than the extent $D_2$, or otherwise such that a forwardly-facing thrust surface, 92, is defined. In any event, the extent $D_3$ may be marginally larger than the tubing outer diameter such that the tubing end 23 (FIG. 1) may be received therethrough and into abutting engagement with a corresponding end, 93 (FIG. 1), of the fitting 26.

In use, and with additional reference to FIG. 1, as the nut forward end 64 is threaded onto the fitting end 93, the thrust surface 92 may abuttably engage and draw the fitting ferrule 29 (FIG. 1) forwardly into compression against the fitting end. Such compression causes a deformation of the ferrule 29 which, in turn, grippably retains the tubing end 23 in a fluid-tight or other engagement with the fitting end 93.

With continuing reference to FIG. 1, the assembly 10 may be assembled, for example, by inserting the nut engaging portion 76 into the guard body first end 34 such that the barbs 78 engage the guard body end portion 40. Thereupon the tubing end 23 may be inserted into the guard body second end 36 and advanced forwardly through the guard 20 and the nut 27 such that the guard and nut are sheathed coaxially over the tubing exterior surface 22. A rearward facing shoulder or other surface, 94, of the nut flats portion 74 and/or an end wall, 96, of the guard body end portion 40 may function as a stop to delimit the forward advancement of the guard 20 over the nut 27. Of course, the guard 20 and nut 27 alternatively may be sheathed separately over the tubing exterior surface 22, and thereafter engaged while on the tubing 24, such as by using the body segment 52 as a handle with which to push the guard end 34 over the nut engaging portion 40 either before or after the nut 27 has been connected to the fitting body 28.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A guard assembly comprising:
   a conduit having a generally cylindrical external surface and an end couplable to a connection;
   a nut received over the conduit external surface for coupling the conduit end to the connection, the nut extending longitudinally along a central axis thereof intermediate a forward end portion couplable to the connection and a rearward end portion having an outer radial surface formed has having one or more projections; and
   a guard received coaxially over the conduit external surface, the guard comprising an elongate, generally-annular body extending longitudinally along a central axis thereof intermediate a first end and a second end, the body first end having an inner radial surface fitted over the outer radial surface of the nut rearward end portion,
   wherein the body first end is pushed onto the nut over the rearward end portion thereof joining the guard body to the nut, the one or more projections engaging the inner radial surface of the body first end delimiting the guard body from being pulled off of the nut.

2. The guard assembly of claim 1 wherein the body is formed of a resilient polymeric material.

3. The guard assembly of claim 2 wherein the polymeric material is a plastic.

4. A guard assembly comprising:
a conduit having a generally cylindrical external surface and an end couplable to a connection;
a nut received over the conduit external surface for coupling the conduit end to the connection, the nut extending longitudinally along a central axis thereof intermediate a forward end portion couplable to the connection and a rearward end portion having an outer radial surface; and
a guard received coaxially over the conduit external surface, the guard comprising an elongate, generally-annular body extending longitudinally along a central axis thereof intermediate a first end and a second end, the body first end having an inner radial surface fitted over the outer radial surface of the nut rearward end portion,
wherein the guard body is formed as having a first segment adjacent the first end and a second segment adjacent the second end, the first segment being formed to be substantially rigid, and the second segment being formed to be flexible.

5. The guard assembly of claim 4 wherein the conduit has a minimum bend radius, and wherein the body second segment conforms to the conduit when the conduit is flexed along its minimum bend radius.

6. The guard assembly of claim 4 wherein the first segment of the guard body is configured as a handle.

7. The guard assembly of claim 4 wherein the second segment of the guard body is tapered.

* * * * *